United States Patent [19]
Chapman

[11] Patent Number: 5,174,593
[45] Date of Patent: Dec. 29, 1992

[54] CAMERA DOLLY

[75] Inventor: Leonard T. Chapman, North Hollywood, Calif.

[73] Assignee: Leonard Studio Equipment, Inc., North Hollywood, Calif.

[21] Appl. No.: 591,524

[22] Filed: Oct. 1, 1990

[51] Int. Cl.⁵ .............................................. B62B 3/00
[52] U.S. Cl. ............................... 280/47.11; 180/234; 280/91; 280/99; 280/100; 474/63
[58] Field of Search ................ 280/47.11, 91, 99, 100; 180/234; 474/63, 61

[56] References Cited

U.S. PATENT DOCUMENTS

| | | | |
|---|---|---|---|
| 2,715,534 | 8/1955 | Hoge et al. | 280/47.11 |
| 2,756,066 | 7/1956 | Ludowici | 280/91 |
| 2,842,376 | 7/1958 | Krilanovich | 280/91 |
| 3,018,116 | 1/1962 | Summers et al. | 280/91 |
| 3,134,455 | 5/1964 | Fiorentini | 180/79.2 |
| 4,003,584 | 1/1977 | Zelli | 280/47.11 |
| 4,248,444 | 2/1981 | Johnson | 280/47.11 |
| 4,257,619 | 3/1981 | Fisher | 280/91 |
| 4,335,626 | 6/1982 | Fisher | 74/496 |
| 4,950,126 | 8/1990 | Fabriano et al. | 280/91 |

OTHER PUBLICATIONS

Drawing Design "Peewee/Hybrid Dolly Transmission".
Drawing Design "Peewee Transmission".

Primary Examiner—Eric D. Culbreth
Attorney, Agent, or Firm—Lyon & Lyon

[57] ABSTRACT

A steering compensator has a shaft with a first shaft section offset from a central shaft section. A second shaft section of the shaft is offset from the first and central shaft sections. A first drive member is rotatably attached to the first shaft section and a second drive member is rotatably attached to the second shaft section. A central member is rotatably attached to the central shaft section between the first and second drive members. A pivotal link interconnects the first and second drive members through the central member to allow relative angular displacement between the first and second drive members. The steering compensator provides steering angle correction in conventional steering.

16 Claims, 10 Drawing Sheets

TABLE 1

| r = | 131.00 | 61.00 | 30.50 | 15.25 | 7.62 | 0.0 | -5.04 | -10.079 |
|---|---|---|---|---|---|---|---|---|
| a = | 14.04 | 28.24 | 47.04 | 65.04 | 76.91 | 90.00 | 98.75 | 107.10 |
| b = | 12.23 | 21.98 | 32.89 | 42.77 | 49.70 | 58.39 | 65.23 | 72.90 |

CAMERA DOLLY

CROSS REFERENCE TO RELATED APPLICATION

A related application, U.S. patent application Ser. No. 591,525, filed concurrently herewith describes a camera pedestal which may be used with the camera dolly described in this application. This related application by Inventor Leonard T. Chapman filed on the same day as this application and captioned "CAMERA PEDESTAL" is fully incorporated herein by reference.

BACKGROUND OF THE INVENTION

The application relates to the field of mobile wheeled equipment and specifically to camera dollies and cranes used in the television and motion picture industries. In the production of television programs or motion pictures, it is often necessary to maneuver a camera between different filming positions. The required camera movement may include elevating and lowering the camera as well lateral and longitudinal movement between the camera and subject. Continuous translation of the camera, i.e., to follow an action or moving sequence is also occasionally called for. Camera cranes and dollies are employed to support the camera and perform the desired camera movement.

For filming in close quarters, a compact camera dolly is desired. For example, to fit through narrow doorways, the length and width of the camera dolly should be limited. With the advent of widespread "on location" filming, the camera dolly may have to be hand carried, e.g., up narrow stairways, across uneven outdoor terrain, etc. Accordingly, it is desirable for the camera dolly to be lightweight and easily carried.

It is important for the camera dolly to provide a stable platform for the camera, both at rest and when moving, since any shock, vibrations, jarring or rocking imparted by the dolly will cause the recorded film or video image sequence to "jump" unacceptably. Consequently, the dolly structure must be rigid and secure. The camera dolly should preferably also be capable of readily supporting not only a camera of substantial weight, but also a camera operator and a second individual such as a cinematographer, director, lighting specialist, etc. Preferably, the camera dolly is able to quickly, but silently and smoothly translate, rotate and elevate the camera. Quiet operation of all aspects of dolly movement, such as rolling, steering, turning and elevating or lowering a camera is especially important during the production of live television wherein even intermittent low or muffled equipment noise can be disruptive.

For added versatility, the camera dolly should be capable of both conventional steering and crab steering. In conventional steering, to maintain acceptable steering performance while the dolly is steered on a curved path, a conventional steering corrector or transmission is required. See, for example, U.S. Pat. No. 4,003,584 to Zelli. The corrector adjusts the steering angle of the camera dolly wheels to allow the camera dolly to properly track a curved path. This prevents any scraping or scrubbing of the wheels against the floor or supporting surface which would tend to vibrate and disturb the camera and filming sequence as well as increasing rolling friction or resistance.

For translational filming sequences over uneven surfaces, for example on outdoor terrain, track rails can be laid to provide smooth rolling surface for the camera dolly. The camera dolly should accordingly be able to quickly and easily be set up for use on track rails.

Both 3-wheel and 4-wheel camera dollies or pedestals have been proposed and used in the past (generally having dual wheels at each corner). Three-wheel configurations are advantageous as they are stable, i.e., a tripod configuration, even on uneven ground. However, three-wheel dollies or pedestals are not well suited for operation on track. Four-wheel camera dollies can perform well on track and have much larger wheelbase ranges but can be less stable than three-wheel units. For example, a slight bump under a wheel of a four-wheel unit can cause it to rock or tip slightly, whereas a three-wheel unit would be largely unaffected. Consequently, heretofore, there have been tradeoffs to be weighed in selecting a three-wheel or a four-wheel design.

Accordingly, it is an object of the invention to provide a camera dolly having improved conventional steering performance.

It is a further object of the invention to provide such a camera dolly which is exceptionally quiet in operation.

It is yet another object of the invention to provide such a camera dolly which can be readily shifted between conventional steering and crab steering.

It is yet another object of the invention to provide such a dolly which is relatively lightweight and portable yet providing a stable and secure camera platform.

It is still another object of the invention to provide a four wheel camera dolly having advantages of both a three-wheel configuration and a four-wheel configuration.

It is still another object of the invention to provide a combination camera dolly/pedestal having a separable pedestal which can be removed and used apart from the dolly.

It is another object of the invention to provide a camera dolly having a chainless steering system.

It is still another object of the invention to provide such a camera dolly having an attractive and streamlined appearance and a wide range of camera positions, including a very low position.

Other and further objects and advantages will appear hereinafter.

SUMMARY OF THE INVENTION

To these ends a steering compensator includes a shaft having a first shaft section and a central shaft section offset from the shaft section. A second section of the shaft is offset from the first and central shaft sections. A first drive member is pivotally or rotatably attached to the first shaft section and a second drive member is similarly attached to the second shaft section. A central member is pivotally or rotatably attached to the central shaft section in between the first and second drive members. A pivotal link connects the first and second drive members, through the central member, to allow relative angular displacement between the first and second drive members. The central member preferably is a disk and the first and second drive members are preferably sprockets having base plates. The pivotal link most desirably includes a pin extending from a first slide block axially slidable in a groove in the first drive member plate, through a bore in the central member, and connecting to a second slide block radially slidable in a groove in the second drive member plate.

In an adjustable steering compensator, an eccentric drive collar is rotatably mounted on a first shaft section with a first drive member secured to the eccentric drive collar. A central member is secured to a floating hub rotatably attached to a central shaft section. A second drive member is rotatably attached to a second shaft section as in the "fixed" steering compensator. The first drive member is pivotally linked to the second drive member through a pin secured in slide blocks positioned in radial slots in the first and second drive members. The pin extends through a hole in the central member. A drive collar stub extends from the eccentric drive collar into the floating hub to pivotally link the floating hub and drive collar. A knob or handle attached to the eccentric drive collar is used to shift the adjustable steering compensator between first and second configurations. The first configuration is used when the camera dolly legs are all positioned straight ahead (i.e., the narrowest dolly configuration) and for the 3-point simulation mode, i.e., with the rear dolly legs close together and the front dolly legs spaced apart at a maximum distance with the front dolly legs perpendicular to the sides of the dolly chassis. With the adjustable steering compensator shifted into its second mode, steering correction is provided when the dolly legs are in the track position (standard track wheel base being 24.562 inches in width). The adjustable steering compensator accordingly, provides exceptionally accurate steering angle compensation for all required dolly leg configurations.

A steering mode shift apparatus for shifting between crab and conventional steering in a camera dolly comprises a housing and a first shift plate slidably supported on a shaft extending through the housing. A second shift plate is slidably supported on the shaft and spaced from the first shift plate. A support is positioned at least partially around the shaft and fixed to the housing. A crab drive member having a pin bore is rotatably mounted to the shaft. Similarly, a conventional steering drive member, also having a pin bore, is rotatably mounted to the shaft. A crab shift pin extends from the second shift plate through the support. A conventional steering shift pin extends from the first shift plate and is reversably engageable into the pin bore in the conventional steering member. A shift mechanism is provided for reversably shifting the second shift plate between a crab position and a conventional steering position. In the crab position, the second shift plate is spaced apart from the crab member or sprocket and the crab shift pin is withdrawn from crab member allowing the crab member to rotate with a tubular axle. In the steering position, the crab shift pin engages the crab sprocket preventing it from rotating and the conventional steering shift pin is disengaged from the conventional steering member or sprocket which is then free to rotate. The shifting mechanism preferably includes a shift linkage having a pivot fork attached to the shaft, a shift linkage shaft attached pivot fork, and a shift handle for rotating the shift linkage shaft to thereby shift the shaft between the crab and conventional steering conditions.

A combination camera dolly and pedestal steering system comprises a displaceable steering wheel and an adjustable length shaft linking the steering wheel to a first sprocket or drive member. A first shift assembly has a crab sprocket, a conventional steering sprocket, and means for alternately linking the first sprocket with either the crab sprocket or conventional steering sprocket. A steering corrector is linked to the conventional steering sprocket. A crab drive line interconnects crab sprockets at each of the dolly legs. A second sprocket shift assembly has a crab sprocket, a conventional steering sprocket and means for linking either the conventional steering sprocket to the steering corrector or its crab sprocket to the crab drive line.

BRIEF DESCRIPTION OF THE DRAWINGS

Other objects and features of the present invention will become apparent from the following detailed description taken in connection with the accompanying drawings. It is to be understood, however, that the drawings are designed for the purpose of illustration only and are not intended as a definition of the limits of the invention.

In the drawings, wherein similar reference characters denote similar elements throughout the several views.

DETAILED DESCRIPTION OF THE PREFERRED EMBODIMENT

Figure 1:
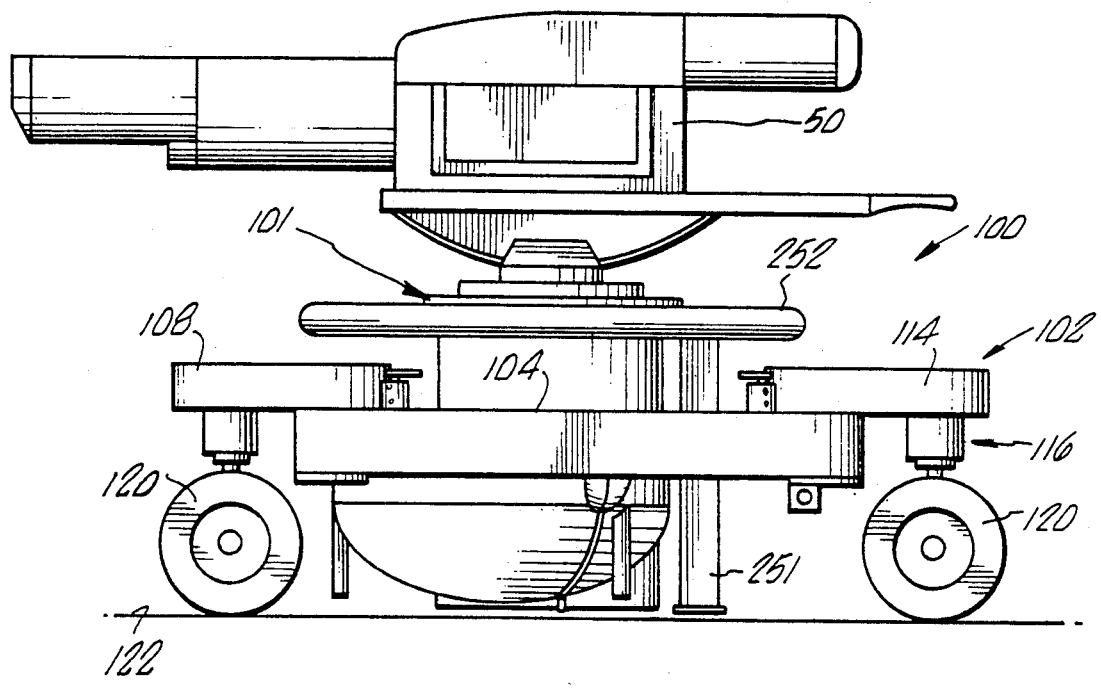
FIG. 1 is a left side elevation view of the present camera dolly including an associated pedestal supporting a camera.

Turning now in detail to the appended drawings, as shown in FIG. 1, a television or motion picture camera 50 is mounted on to a dolly/pedestal unit 100 comprising a dolly 102 and a separable pedestal 101. A description of the pedestal 101 is set forth in U.S. patent application Ser. No. 591,525 and fully incorporated herein by reference.

Figure 2:
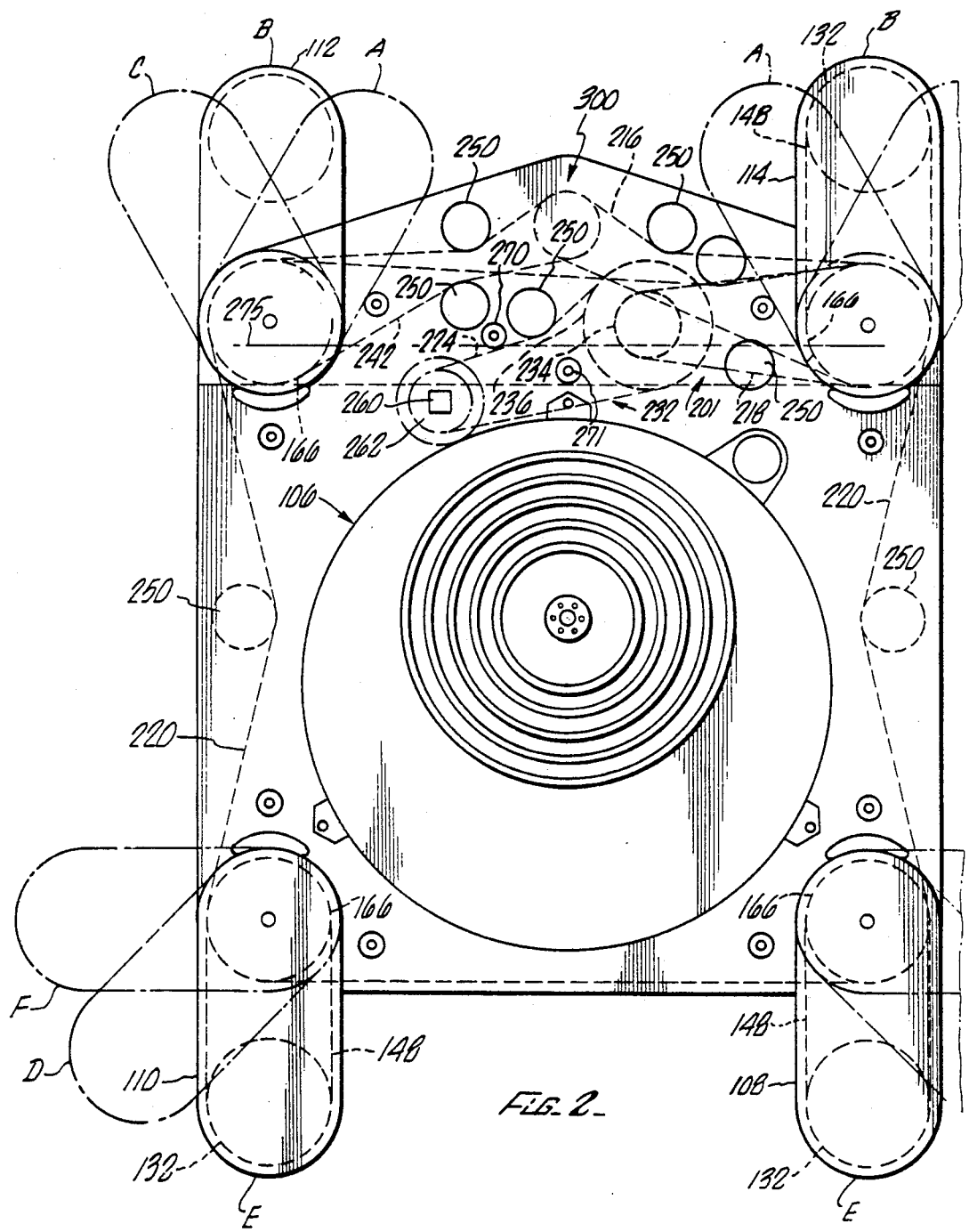
FIG. 2 is a schematically illustrated top view thereof with the camera removed and showing the present steering drive system.

The dolly 102 includes a dolly chassis 104 having a generally round pedestal opening 106 (FIG. 2) extending through the dolly chassis 104 for receiving and supporting the pedestal. Three recessed mounting positions with threaded holes are provided around the opening 106 for accepting and securing the pedestal 101 into the dolly 102, while maintaining a flat dolly deck surface. Pivotally attached to the dolly chassis 104 are chassis legs, described herein as the front left leg 108; the front right leg 110; the rear right leg 112; and the rear left leg 114. As shown in FIG. 2 the rear legs 112 and 114 can be pivoted on the dolly chassis 104 into leg positions A, B, and C. Similarly, the front legs 108 and 110 may be pivoted into leg positions D, E and F. Other leg positions may also be used.

With the rear dolly legs in position B and the front dolly legs in position E, the dolly is in the straight ahead or narrowest width dolly configuration. With the rear dolly legs in position C and the front dolly legs in position D, the dolly is in the track position, i.e., the dolly is configured to roll on standard track having 24.562 inch centers, i.e., the centerlines of the two rails of the standard track are spaced apart by 24.562 inches. With the rear dolly legs in position A and the front dolly legs in position F, the dolly is in a simulated three-point suspension configuration, i.e., the camera dolly approximates a tripod suspension.

Figure 3:
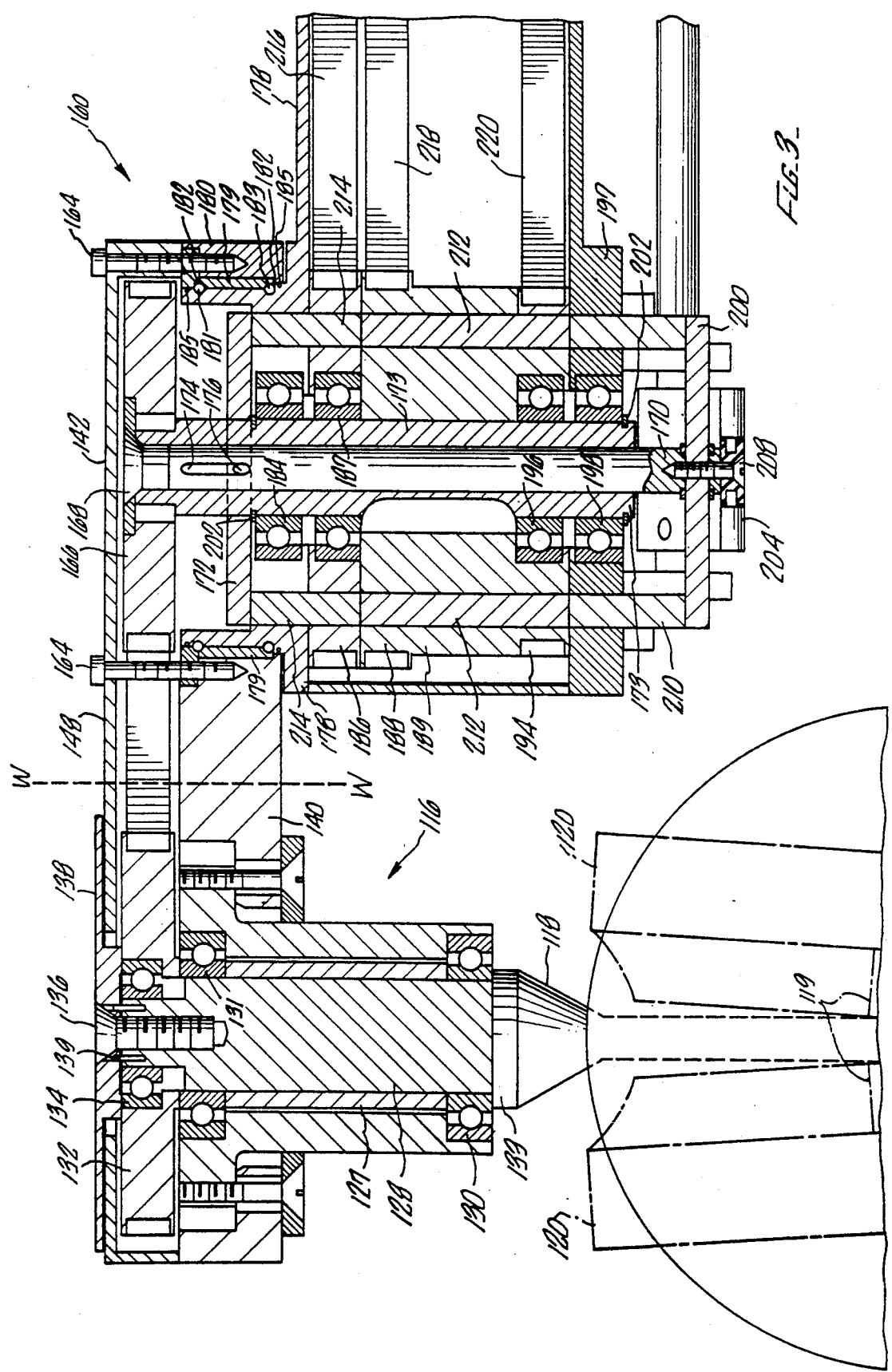
FIG. 3 is a section view fragment of the rear left leg and chassis section of the dolly of FIG. 1 illustrating the present crab-conventional steering shift apparatus.

Referring to FIG. 3, the left rear-wheel assembly 116 is described herein in detail. It will be understood, however, that the other three-wheel assemblies on the dolly 102 will have similar construction. (The wheel assembly 116 comprises the structure to the left of line W—W in FIG. 3) A king pin 118 includes axles 119 extending at a dihedral angle. Wheels 120 are rotatably mounted on the axles 119. The wheels 120 are configured to roll either on the ground 122 or on a standard industry track rail. A king pin shaft 128 extends through a king pin shaft bearing 130 supported by a king pin ferrule 133. A sleeve 127 spaces apart bearings 130 and 131. A king pin sprocket 132 is mounted over a king pin sprocket bearing 134 on the king pin shaft 128. A wheel assembly steering locking bolt 136, preferably a flat head cap screw, extends through a cover plate 138 into a threaded hole in the top end of the king pin shaft 128. Locking pins 139 extend from the king pin shaft 128 adjacent to the locking bolt 136. When the locking bolt 136 is tightened into the king pin shaft 128 the pins 139 cause the cover plate 138 and king pin sprocket 132 to lock against and rotate with the king pin shaft 128. Locking bolt 136 is loosened to align the wheel assembly and then retightened. Specifically, to align the wheel assembly, the dolly steering system is turned to a straight ahead bearing. The cover plate 138 has three grooves or markings corresponding to the three leg settings. With the locking bolt 136 loosened, the king pin 118 is turned to align the appropriate marking on the cover plate 138 with a reference mark on the upper leg frame 142. The locking bolt 136 is then retightened.

Figure 5:
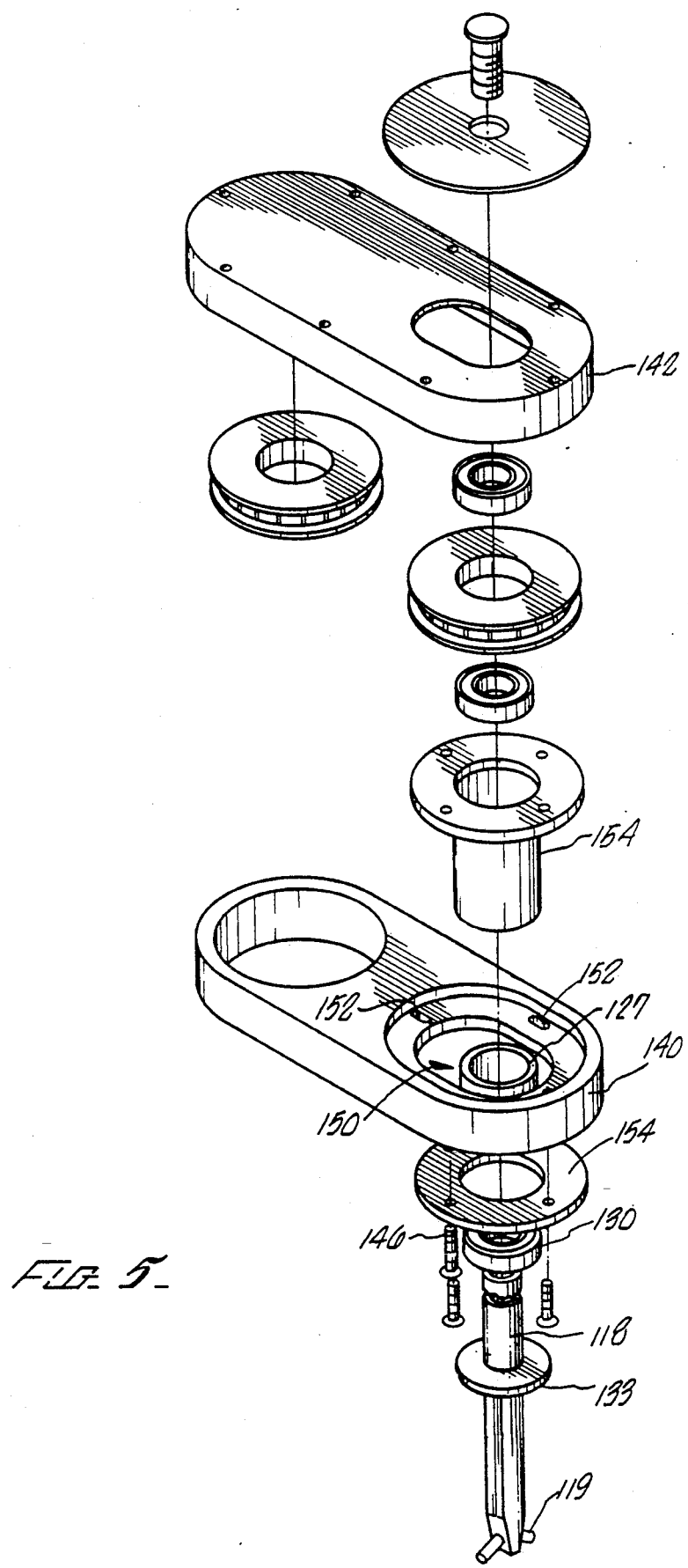
FIG. 5 is an exploded perspective view of a leg of the camera dolly of FIG. 1 illustrating the present adjustable leg belt tensioning apparatus.

Each leg 108, 110, 112 and 114 comprises a lower leg frame 140 and an upper leg frame 142. As shown in FIG. 5, the lower leg frame 140 has an elongated or oval opening 150 and slotted holes 152 for securing the king pin armature 154 to the lower leg frame 140. The slotted holes 152 allow the king pin armature 154 to be slidably positioned to adjust the appropriate tension in the leg belt 148. The king pin ferrule 133 is clamped into position using clamping bolts 146 after the position of the king pin ferrule 133 has been adjusted for proper tensioning.

As shown in FIG. 3, in a left shift assembly 160, the upper leg frame 142 is secured to an outer bearing frame 180 by bolts 164. Within the left steering shift assembly 160 is a leg drive sprocket 166 linked by belt 148 to the king pin sprocket 132 (See FIG. 2 also). A cap screw 168 secures the leg drive sprocket 166 to a tubular axle 173 extending substantially vertically throughout the steering shift assembly 160. An upper plate 172 is vertically slidable in a slot 174 on the shaft 170 by a pin 176.

A hardened inner bearing frame 178 pivotally supports the leg 114 (and legs 108, 110, and 112) on the dolly chassis 104. The outer bearing frame 180 has a hardened liner 179 which is fitted over the inner bearing frame 178 to form the bearing to pivotally mount the legs 114 Balls 182 are positioned within upper and lower annular openings 181 and 183 formed by the inner and outer bearing frames 178 and 180.

Since the outer bearing frame 180 is a structural member of the dolly, the shift assembly 160 can be made lightweight and compact. Seals 185 maintain lubricant with the bearings and keep contaminants out.

Referring still to FIG. 3, a conventional steering sprocket 186 is rotatably mounted on the tubular axle 173 by a bearing 187. Similarly, a crab sprocket 194 is rotatably mounted on the tubular axle 173 by crab sprocket bearings 196. A shaft drive sprocket 188 is irrotatably mounted on and keyed to the tubular axle 173. A drive sleeve 189 rigidly attaches the shaft drive sprocket 188 to the crab sprocket 194. Plate bearings 184 and 198 support the shaft 170 within the inner bearing frame 178 and lower support plate 197. Retaining rings 202 secure the tubular axle 173 vertically within the shift assembly 160 on the inner races of bearings 198 and 184. A lower plate 200 is secured to the lower end of the tubular axle 173 by cap screw 208. Lower shift pins 210 resting against the lower plate 200 extend through the lower support 197 and butt against middle shift pins 212 which extend through the crab steering sprocket 194 and drive sprocket 188. Upper shift pins 214 rest against the middle shift pins 212 and extend through the conventional steering drive sprocket 186. The upper ends of the upper shift pins 214 are secured to the upper plate 172.

A pivoting fork shift assembly 204 allows the lower plate 200 to be shifted from a lower or crab steering position (as shown in FIG. 3) wherein the middle shift pins 212 cause the drive sprocket 188 to be engaged to the crab steering sprocket 194 (to implement crab steering); to a second or conventional steering position wherein the lower plate 200 is shifted upwardly such that the crab sprocket 194 is engaged to the fixed lower support 197 by the lower shift pins 210, and wherein the middle shift pins 212 cause the drive sprocket 188 to engage and rotate with the conventional steering sprocket 186—to implement conventional steering. Thus, with the shift assembly 160 shifted into the crab steering mode, the drive sprocket 188 turns with the crab sprocket 194, while the conventional steering sprocket 186 remains fixed. On the other hand, with the shift assembly 160 shifted into the conventional steering mode, the crab sprocket 194 remains fixed while the conventional steering sprocket 186 rotates with and is driven by the drive sprocket 188.

Figure 6:
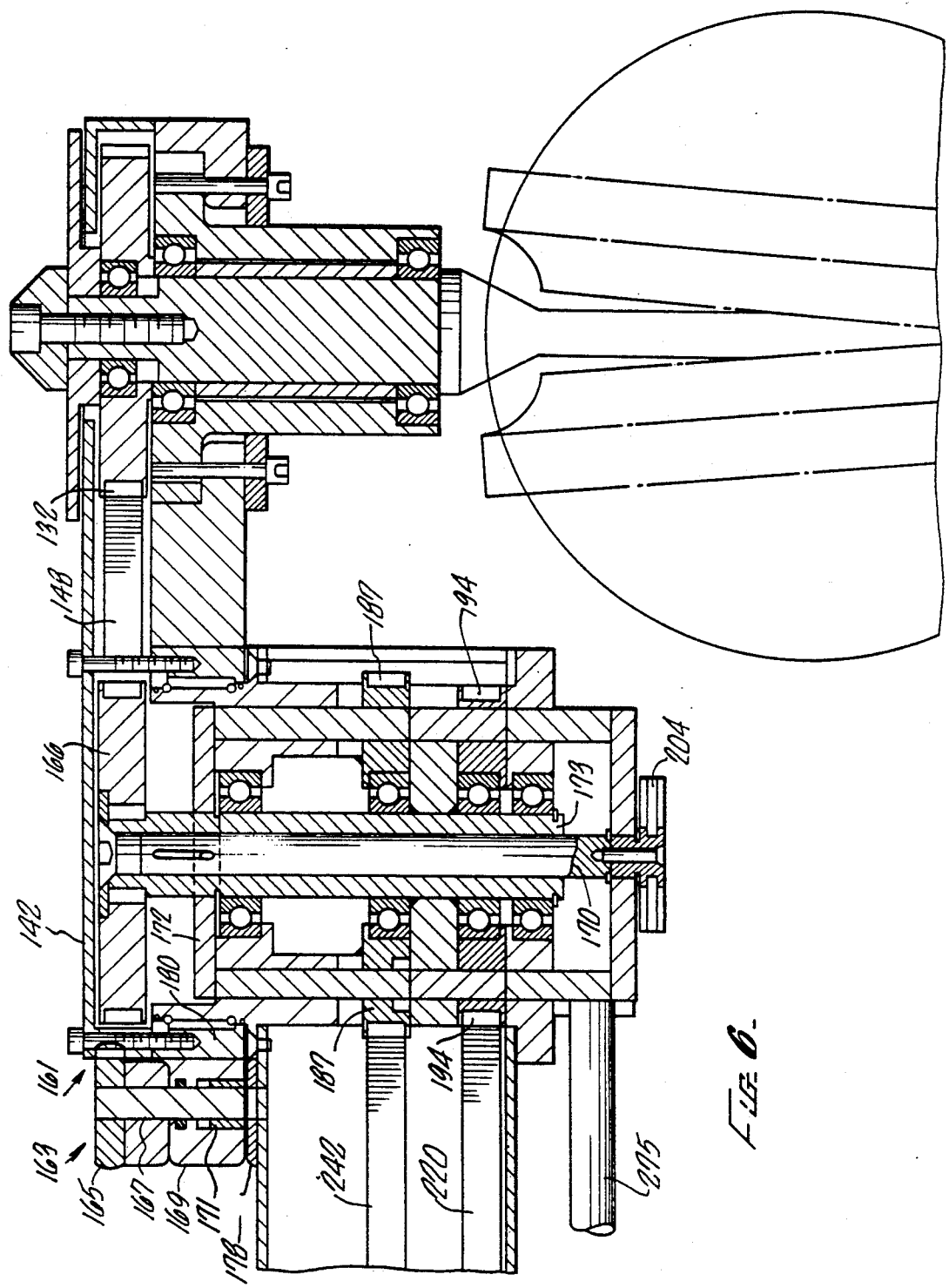
FIG. 6 is a section view fragment of the right rear leg and chassis of the dolly of FIG. 1.

As shown in FIG. 6, a second or right side steering shift assembly 161 is provided at the right rear of the dolly 102. However, this shift assembly 161, although similar to shift assembly 160, does not include a shaft drive sprocket 188. The front legs do not include or require any steering shift mechanism or a conventional steering drive sprocket, since the front wheels of the dolly are either in a fixed "straight ahead" position or are engaged in the crab steering mode. The front wheels of the dolly do not require or perform conventional steering correction as do the rear wheels.

Figure 4:
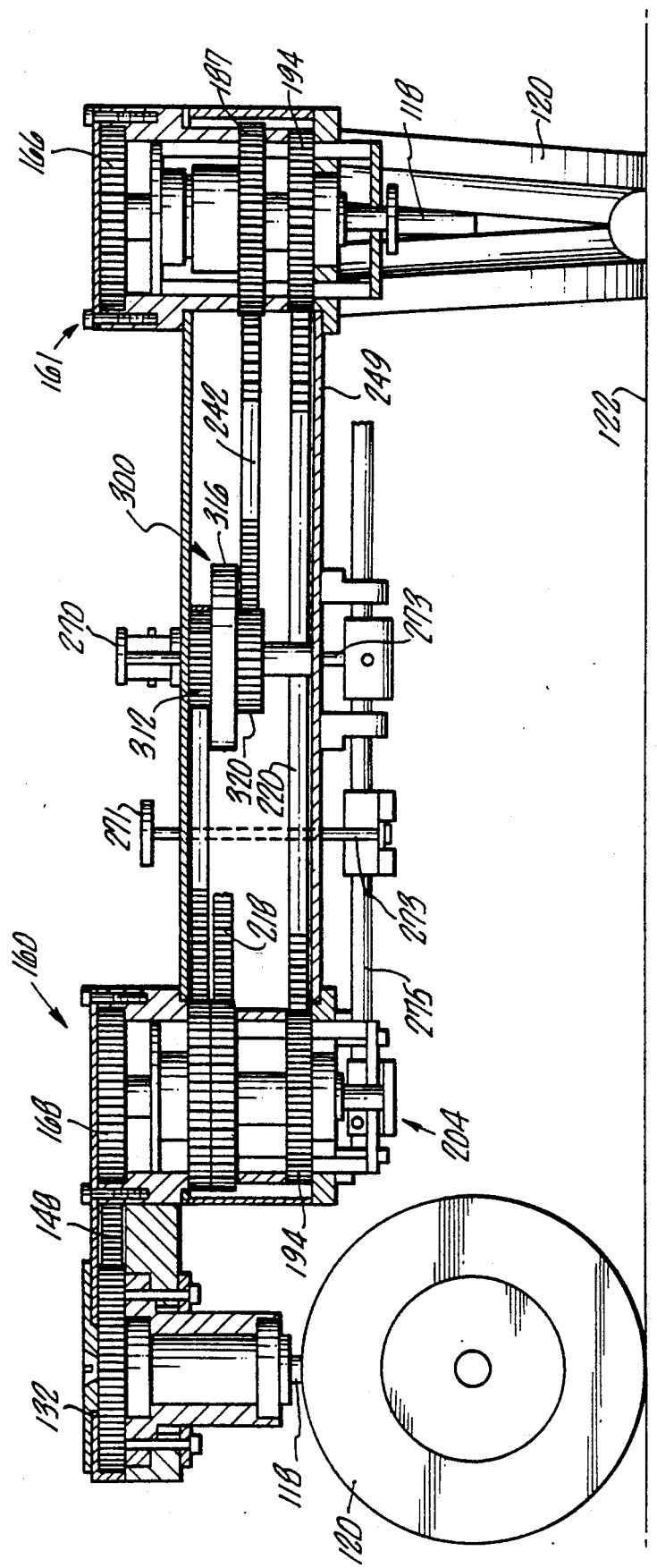
FIG. 4 is a partial section view of the back end of the dolly of FIG. 2 further illustrating the shift apparatus and steering drive system.

Referring to FIGS. 3 and 4, the dolly 102 can be shifted from conventional steering to crab steering and vice versa by actuation of the shift pedals or knobs 270 and 271. With the shift knob 270 in the "up" position as shown in FIG. 4, the lower plate 200 in both the left and right shift assemblies 160 and 161 are in the lower or crab position such that the conventional steering sprockets 186 and 187 are deactivated and the crab sprockets 194 and 195 are driven by the steering system 201. With the shift knob 271 in the up position, the plates 200 in the shift assemblies 160 and 161 are displaced upwardly such that the crab sprockets 194 and 195 are deactivated and the conventional steering sprockets 186 and 187 come into play.

As shown in FIG. 4, the conventional shift knob 270 and the crab shift knob 271 are each linked to an extension shaft 273 extending through the dolly chassis to arm linkages joined to a pivot shaft 275. The ends of the pivot shaft 275 are attached to a fork assembly 204 at the left and right shift assemblies 160 and 161. The fork assemblies 204 are pivotally joined to the (vertical) shafts 170 in the shift assemblies 160 and 161. Consequently angular rotation of the shaft 275 causes the vertical shafts 170 to shift between and conventional and crab steering modes. As shown in FIG. 2, the shaft 275 is positioned between the crab and conventional steering knobs 271 and 270. As one knob is depressed, the other is raised, as the dolly is shifted between conventional and crab modes, via the vertical shift movement of the tubular axle 173, lower plate 200 and the shift pins 210, 212 and 214. The knobs 270 and 271 can also be operated by foot.

Thus, the steering shift assembly 160 and 161 allow the dolly 102 to be shifted from conventional steering, i.e., wherein the front wheels of the dolly would remain fixed in a "straight ahead" position with the rear wheels performing the steering, to a crab steering mode wherein all wheels remain parallel to each other and in the same direction, such that the dolly can "crab".

Figure 7:
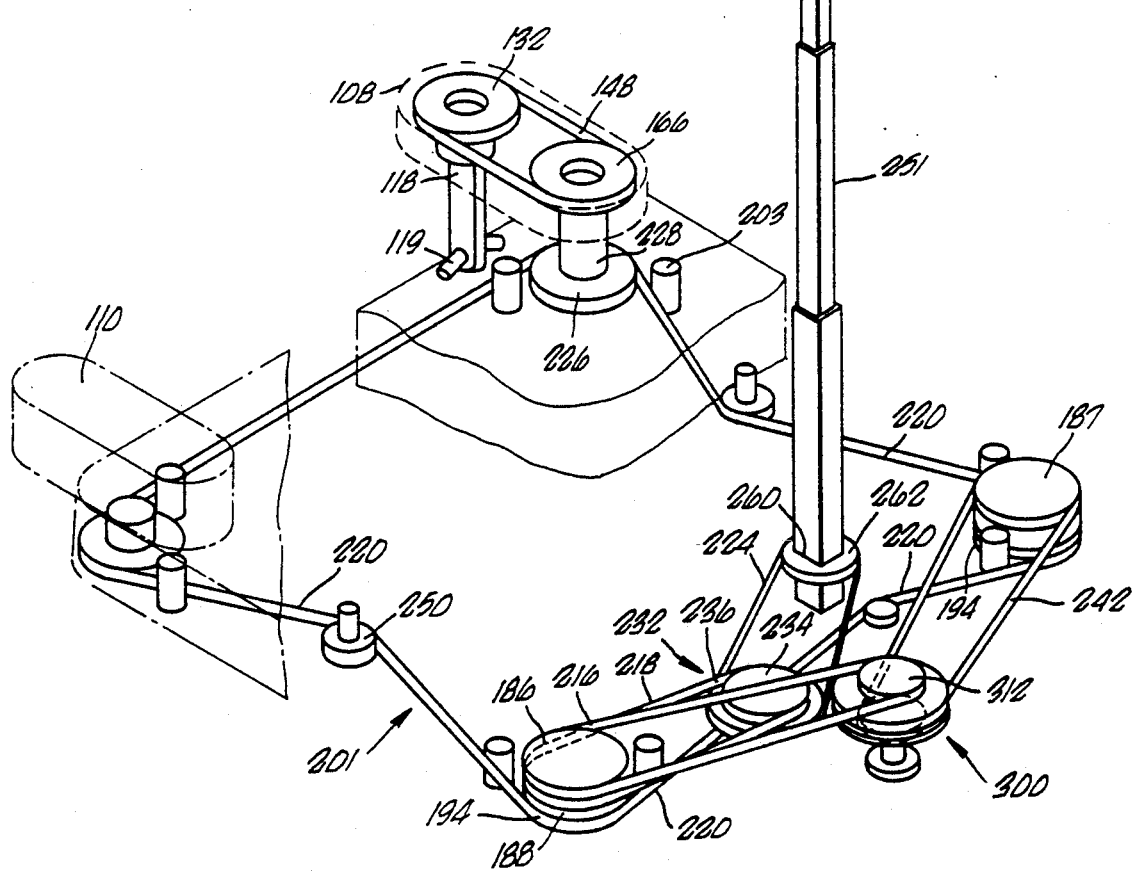
FIG. 7 is a schematic illustration of the steering system of the camera dolly of FIG. 1 linked to a steering assembly of a camera pedestal.

FIGS. 2 and 7 illustrate the steering system 201 of the dolly unit 102. As shown therein, the crab belt 220 continuously loops around and drivingly engages the crab sprockets 194 and front chassis sprockets 226, all of which are contained within the dolly chassis 104. The front chassis sprockets 226 are keyed or fixed to a shaft which drives the drive sprockets 166 in the front legs 108 and 110. Idler pulleys 250 are provided along the sides of the chassis for tensioning the crab belt 220. All of the belts in the steering system 201 are toothed rubber belts and have a flat back surface, such as Gates Rubber Co. POLYCHAIN GT belts.

A primary sprocket 262 has a through square receptacle 260 adopted to receive a telescoping steering drive shaft 251 linked to the steering assembly of the pedestal, as described in U.S. application serial no. 591,525. A first ratio belt 224 drivably connects the primary sprocket 262 to an outer or second sprocket 236 on a two stage idler 232. A first or inner sprocket 234 of the two stage idler 232 is linked by the drive belt 218 to the shaft drive sprocket 188, as shown in FIG. 3. The conventional steering sprocket 186 is connected by the left conventional steering belt 216 to a steering corrector unit 300, and specifically to a first sprocket 312 on the corrector 300. A second sprocket 320 on the corrector 300 is linked by a right conventional steering belt 242 to a right conventional steering sprocket 187 within a right shift assembly 161, as shown in FIG. 6. Idler pulleys are provided as shown in FIG. 2 to provide proper belt tensioning and for alignment purposes during manufacture or maintenance.

The sprockets in the steering system are selected so that the wheels 120 of the dolly will move directly and with the same turning angle as the steering wheel 252 on the pedestal. These ratios can be achieved by using 8M22 sprockets for sprockets 262, 234, 312 and 320; 8M40 sprockets for sprockets 132, 166, 226 and 194; 8M44 sprockets for sprockets 186, 188 and 23 are also available from Gates Rubber Co. (the last 2 digits indicating the number of sprocket teeth). These sprockets can be machined down in height to maintain a compact and streamlined dolly chassis. Use of these sprockets with the Gates POLYCHAIN GT belts provides for exceptionally precise movement and handling of the steering system 201 which is very noticeable and desirable to the dolly grip or user. This steering system is also very quiet in operation permitting it to be freely used on sound stages without interfering with the audio aspects of television or motion picture production. Although the present embodiment uses toothed belts, chains, if made suitably quiet, could also be used. A leg locking pin system 163 is provided for each leg to lock the leg into its selected position.

Figures 11, 12, 13:
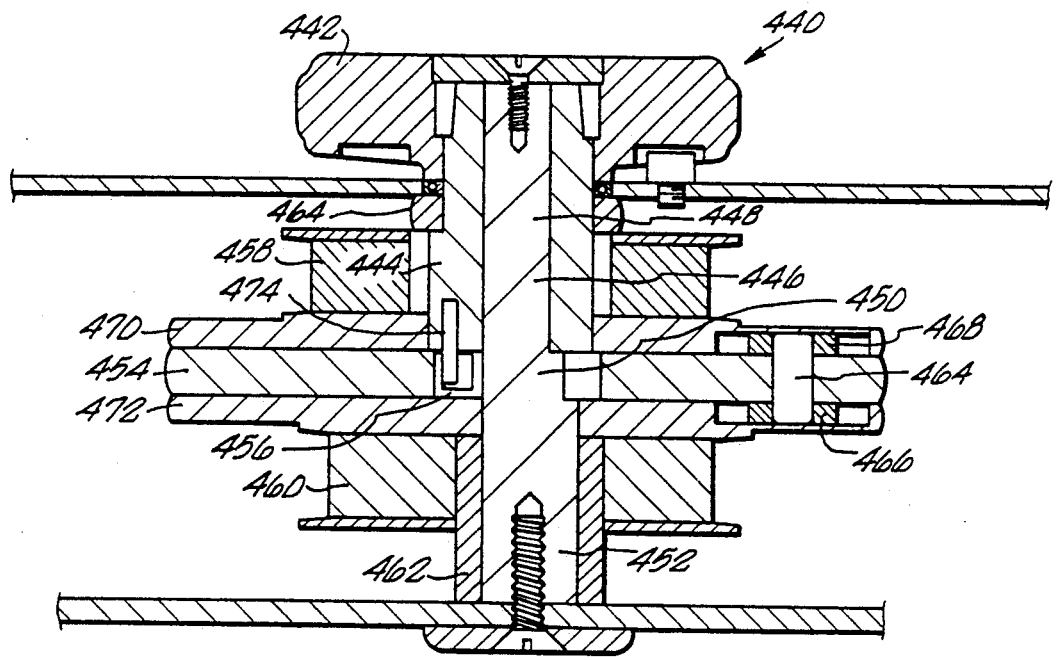
FIG. 11 is a side elevation view fragment in part section of the second embodiment of the leg locking system.
FIG. 12 is a geometric construction of the steering correction provided by the corrector shown in FIG. 9.
FIG. 13 is an alternate embodiment of the steering corrector of FIG. 9.

As shown in FIG. 6, a crescent shaped handle 165 is joined to a pin 167 in a pin frame 169. A bushing or O-ring 171 in the frame 169 surrounds the pin 167 and provides damping to its movement. The pin 167 is releasably engageable through a bore in a flange of the hardened innerbearing frame 178 overlying the dolly chassis. An alternative embodiment operated from underneath the dolly chassis is shown in FIG. 11.

As shown in FIGS. 3, 4, and 7, the dolly chassis may be made as a five-sided weldment with a removable bottom plate spaced apart from the upper plate or deck by extensions 203 (FIG. 7).

Figure 8:
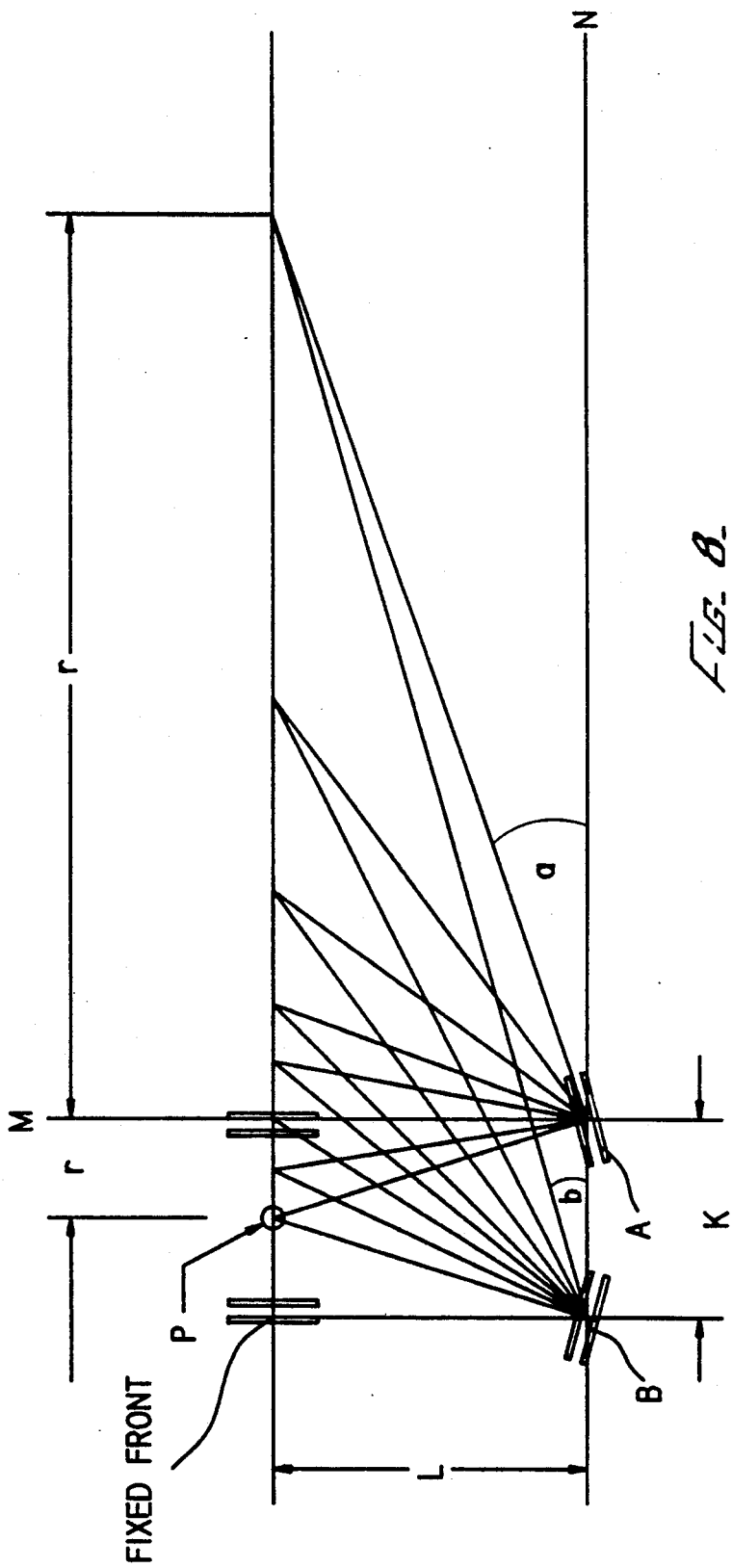
FIG. 8 is a graphic illustration of corrected conventional steering angles.

As is well known in the art, to achieve proper steering geometry with conventional steering, the rear wheels must be oriented so that their axes (i.e., a line perpendicular to the wheels and colinear with the axles) intersect at a point on a line passing through the centerlines of the front wheels. To the extent the rear wheels deviate from this geometry, rolling friction will be increased due to scrubbing of the wheels on the floor surface. This principle is illustrated schematically in FIG. 8 which shows steering angle correction for the dolly 102 when the legs 108, 110, 112, and 114 are in front and rear leg positions E-B and F-A as shown in FIG. 2. FIG. 8 shows the steering correction required in conventional steering, for, as one example, a dolly having wheels (or kingpins) spaced apart side-to-side by a width K=20.158 inches and spaced apart front-to-back by a length L=32.758 inches. The dimension r is the distance or radius in inches from the center of the dolly's radial path of travel to the baseline M extending centrally through the right side wheels. The angles a and b are the angles in degrees of the wheel axles (i.e. or a line extending perpendicular to the plane of the wheels) to the baseline N. As shown in FIG. 8, the steering correction required for the particular dolly example illustrated, in conventional steering of the rear wheels ranges from 0.0 when the dolly 102 is steered to move in a straight line, to a maximum 107.10° for the right rear wheel when the dolly is steered to pivot around point P in FIG. 8. The left and right rear wheels in FIG. 8 are designated by A and B.

Figure 9:
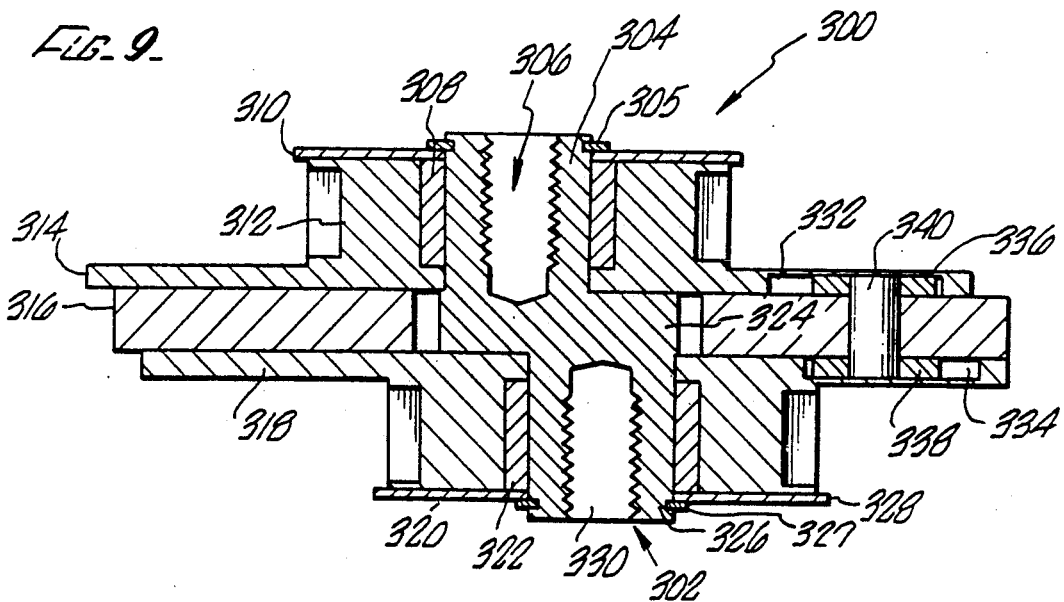
FIG. 9 is a section view of the present steering corrector of the camera dolly of FIG. 1.

A steering corrector or transmission unit 300 sets the proper relative angles of the rear wheels to achieve proper steering geometry. As shown in FIG. 9, the corrector unit 300 includes an eccentric hardened shaft 302 having an upper or first shaft section 304, a central section 324 and a lower or second shaft section 326 offset from the first shaft section 304. A threaded bore 306 extends into the first shaft section 304. Correspondingly, a threaded bore 330 extends into the second shaft section 326. A top sprocket 312 is rotatably mounted onto the first shaft section 304 through a needle bearing 308. A belt flange 310 is integral with the top sprocket 312 and the top sprocket is held onto the first shaft section 304 by a snap ring 305. A top plate section 314 is rigidly attached to or integral with the top sprocket 312. Similarly, a bottom sprocket 320, of the same size and pitch as the top sprocket 312 is rotatably mounted on the second shaft section 326 by a bearing 322. A belt flange 328 is integral with the bottom sprocket 320 which is held onto the second shaft section 326 by a snap ring 327. A lower plate 318 is rigidly attached to or integral with the bottom sprocket 320. A correction disk 316 is rotatably mounted on the central section 324 of the eccentric shaft 302 on a Glacier DU bushing and between the upper plate 314 and lower plate 318.

The top plate 314 section includes a radial slot 332 containing an upper dog plate 336. Similarly, the lower 318 has a radial slot 334 containing a lower dog plate 338. A pin 340 connects the upper dog plate 336 to the lower dog plate 338 through a bore in the disk 316. An alignment hole 342 passes through the plates 314 and 318, and disk 316. During factory assembly, a pin placed in the hole 342 maintaining alignment within the corrector 300 while it is being installed.

When installed in the steering and drive system 201, the eccentric shaft 302 is fixed to the dolly chassis 104 by screw fasteners passing through the dolly chassis 104 into the threaded bores 306 and 330. As the dolly is steered in the conventional steering mode, belt 216 turns the top sprocket 312 on the shaft 302 as shown in FIGS. 2 and 9. The first sprocket 312 is linked to the second sprocket 320 through the interaction of the disk 316 and the interlinked sliding dogs 336 and 338. The geometry of the corrector 300 causes the second sprocket 320 to turn through a "corrected angle" with respect to the first sprocket 312. Correspondingly, the second sprocket 320 drives the right side conventional steering belt 242, thereby driving the sprockets in the right rear leg 112 and causing the right rear wheels to be steered to the proper conventional steering angle. The corrector 300 operates continuously, i.e., it sets very accurate corrected steering regardless of wheel position. If the steering wheel 252 is turned 180°, 360° or through any angle, the corrector 300 uniformly maintains the appropriate conventional steering angles. In addition, testing shows the correction provided by the corrector 300 to be so accurate that any "misalignment" of the rear wheels in conventional steering is so slight as to be beyond human perception.

Figure 10:
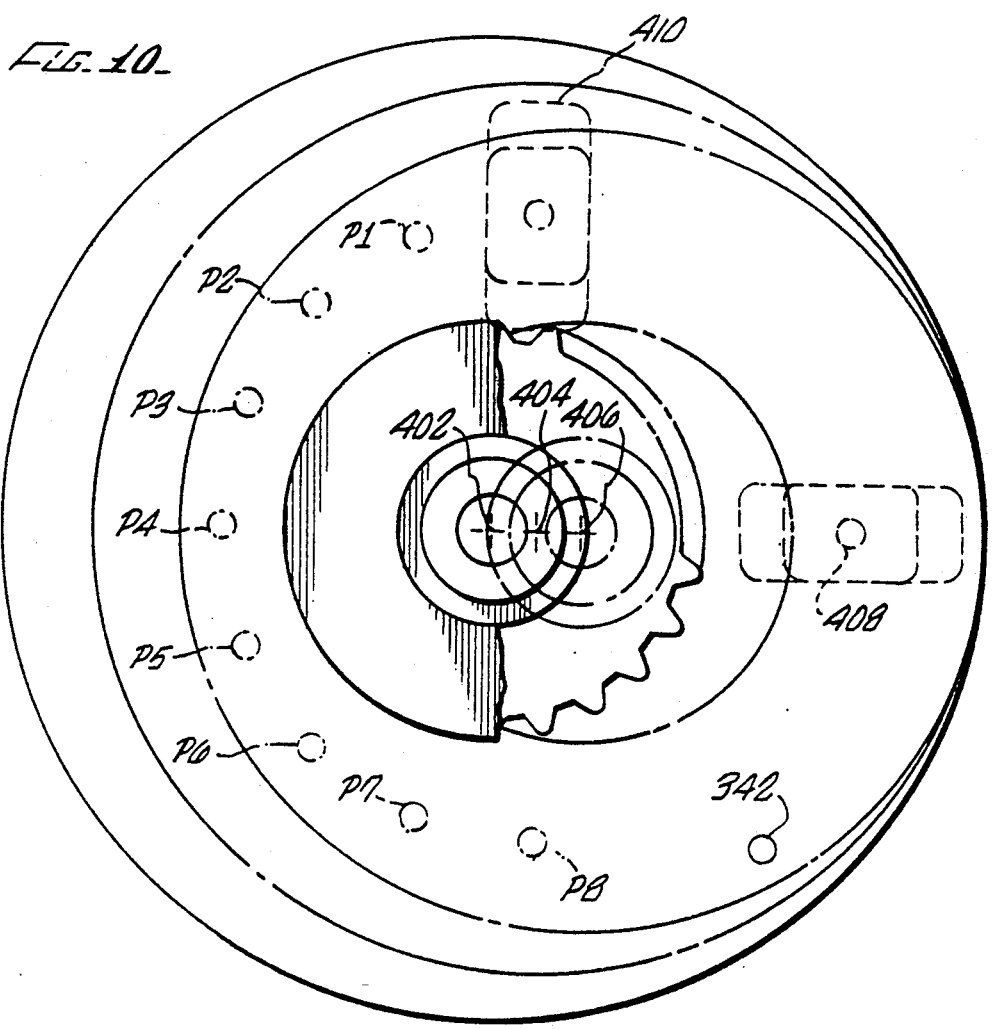
FIG. 10 is a schematically illustrated top view of the steering corrector shown in FIG. 9.

In FIG. 10, 402 represents the axis of the first section 304, 404 represents the axis of the central section 324, and 406 represents the axis of the third section 326 of the shaft 302. Position 408 is shown 90° alignment position. With the sprockets and disk oriented to the position 410 in FIG. 10, there is 0 correction, i.e. the wheels are straight ahead. Positions P1-P8 in FIG. 10 may correspond to the angular wheel positions sown in FIG. 8.

Referring to FIG. 12, the correspondence of the centers of rotation 406, 404 and 402 are graphically represented. They are 420 sweeps through 214.238°, i.e., this is the angle of rotation of the top sprocket 312 about its center of rotation 402, at maximum correction. This corresponds to a king pin angle of rotation of the wheels of 107.10°, due to the 2:1 ratio of the sprocket sizes between the corrected sprockets and the conventional steering sprockets 186 and 187. The lower sprocket 320 which rotates about axis 406, for the same movement, sweeps through arc 422 comprising an angle of 145.093°, again from start or 0 correction to maximum correction. This movement of the lower sprocket 320 turns the right rear wheels to an angle of 72.90°, again one half of the amount of rotation of the sprocket 320 due to the sprocket drive ratios. FIG. 8, in addition, shows the relationships of the intermediate wheel positions designated in FIGS. 10 and 12. Of course, the corrector 300 operates continuously to correct steering regardless of the increments shown or steering angle. The angles selected in FIGS. 8 and 12 are examples selected for illustration purposes.

The corrector 300 shown in FIG. 9 does not provide exact correction for conventional steering when the legs are in the track position. Shown in FIG. 13 is an alternative embodiment of the corrector 300 which is adjustable to provide proper steering correction for all leg configurations. Referring to FIG. 13, an adjustable steering corrector 440 has a knob 442 on top of the dolly chassis. A shaft 446 has a first section 448, a central section 450 and a second section 452 offset from the central and first shaft sections. An eccentric drive collar 444 is rotatably mounted on the first shaft section 448. A central plate 454 is fixed to a floating hub 456 which is rotatably mounted onto the central shaft section 450. A top sprocket 458 is rotatably positioned over the eccentric drive collar 444. A bottom sprocket 460 is rotatably mounted on the lower shaft section 452. Upper and lower spacers 464 and 462 secure the corrector 440 within the dolly chassis. A pin 464 interconnects sliding dogs 466 and 468 which are radially slidable in slots in the plate sections 470 and 472 of the upper and lower sprockets 458 and 460. A collar pin 474 extends from the eccentric drive collar 444 into the floating hub 456. By turning the knob 442, the amount of offset between the axis of rotation of the sprockets 458 and 460 is changed from an amount suitable for correcting steering in the 3-point simulation and straight ahead positions, to correcting steering for the track position. Accordingly, proper steering correction can be implemented in any of the three dolly leg configurations by turning the knob 442 on the corrector 440 to select the appropriate selection mode of the corrector 440.

Thus, while several embodiments have been shown and described, it will be apparent to those skilled in the art that various modifications and additions can be made without departing from the spirit and scope of the invention.

I claim:

1. A steering compensator comprising:
    a shaft having a first shaft section, a central shaft section offset from the first shaft section and a second shaft section offset from the first and central shaft sections;
    a first drive member rotatably attached to the first shaft section;
    a second drive member rotatably attached to the second shaft section;

a central member rotatably attached to the central shaft section between the first and second drive members; and means for pivotally linking said first and second drive members to allow relative angular displacement between them.

2. The steering compensator of claim 1 further comprising a first drive member plate joined to the first drive member and a second drive member plate joined to the second drive member.

3. The steering compensator of claim 2 wherein said means for pivotally linking comprises a pin extending from a first slide block radially slidable in a groove in the first drive member plate, through a bore in the central member and connecting to a second slide block radially slidable in a groove in the second drive member plate.

4. The steering compensator of claim 2 wherein said first plate, second plate and are round and of approximately equal diameters.

5. The steering compensator of claim 1 wherein the central member comprises a disk.

6. The steering compensator of claim 1 wherein the first drive member and second drive member comprise sprockets.

7. The steering compensator of claim 6 wherein the first and second drive members are attached to the shaft with snap rings.

8. The steering compensator of claim 1 further comprising means for attaching the shaft to a camera dolly chassis.

9. A camera dolly having an adjustable steering angle corrector comprising:

a shaft having first shaft section, a hub section, and a second shaft section, offset from each other;

an eccentric collar pivotally supported on the first shaft section;

a first drive member rotatably supported around the eccentric collar;

a hub rotatably supported on the hub section;

means for linking the eccentric collar and the hub;

a second drive member rotatably supported on the second shaft section; and means for linking the first drive member and the second drive member.

10. The corrector of claim 9 further comprising a central plate fixed to the hub.

11. The corrector for claim 10 wherein the means for linking the first drive member and the second drive member comprises a pin extending through the central plate and interconnecting first and second sliding dogs slidably supported in the first and second drive members.

12. The corrector of claim 9 wherein the means for linking the eccentric collar and the hub comprises a pin.

13. The corrector of claim 9 further comprising a knob attached to the eccentric collar.

14. The camera dolly of claim 13 further comprising a dolly top deck and wherein the knob is positioned over the dolly top deck.

15. The corrector of claim 9 wherein the first and second drive members comprise toothed sprockets.

16. A camera dolly having a steering system including a steering compensator comprising:

an offset shaft having an upper segment eccentrically attached to a center segment, and a lower segment eccentrically attached to the center segment opposite to the upper segment;

an upper sprocket rotatably and concentrically attached around the upper segment;

a center disk rotatably attached around the center segment;

a lower sprocket rotatably and eccentrically attached around the lower segment; and a connecting link pivotably joining the upper sprocket and lower sprocket through the central disk.

* * * * *

UNITED STATES PATENT AND TRADEMARK OFFICE
CERTIFICATE OF CORRECTION

PATENT NO. : 5,174,593
DATED : December 29, 1992
INVENTOR(S) : LEONARD T. CHAPMAN It is certified that error appears in the above-indentified patent and that said Letters Patent is hereby corrected as shown below:

Column 1, line 23, after "well" insert -- as --.

Column 2, line 3, after "provide" insert -- a --.

Column 3, line 51, after "from" insert -- the --.

Column 3, line 52, after "the" insert -- conventional --.

Column 6, line 10, after "legs 114" insert --.--.

Column 7, line 26, delete "and".

Column 7, line 35, delete "allow" and insert -- allows --.

Column 7, line 67, after "right" insert -- side --.

Column 7, line 68, after "right" insert -- side --.

Column 8, line 11, delete "23" and insert -- 236 --.

Column 8, line 51, after "shows" insert -- and Table 1 --.

Column 8, line 51, delete "shows" and insert -- show --.

Column 9, line 64, after "90°" insert -- to the --.

Column 9, line 68, delete "sown" and insert -- shown --.

UNITED STATES PATENT AND TRADEMARK OFFICE
CERTIFICATE OF CORRECTION

PATENT NO. : 5,174,593
DATED : December 29, 1992
INVENTOR(S) : Leonard T. Chapman It is certified that error appears in the above-indentified patent and that said Letters Patent is hereby corrected as shown below:

Column 9, line 68, after "FIG. 8" insert --and Table 1--.

Signed and Sealed this

Sixth Day of September, 1994

*Attest:*

BRUCE LEHMAN

*Attesting Officer*         *Commissioner of Patents and Trademarks*